United States Patent [19]

Allemann et al.

[11] Patent Number: 4,504,315

[45] Date of Patent: Mar. 12, 1985

[54] LIQUID ACCELERATOR FOR THE SETTING OF CONCRETE MIXTURES

[75] Inventors: Kurt Allemann, Schmitten, Switzerland; Klaus Deneke, Troisdorf, Fed. Rep. of Germany; Hansjürgen Hass, Troisdorf, Fed. Rep. of Germany; Günter Vogel, Hennef, Fed. Rep. of Germany

[73] Assignee: Dynamit Nobel AG, Troisdorf, Fed. Rep. of Germany

[21] Appl. No.: 582,625

[22] Filed: Feb. 22, 1984

[30] Foreign Application Priority Data

Feb. 24, 1983 [DE] Fed. Rep. of Germany ....... 3306448

[51] Int. Cl.³ ................................................ C04B 7/35
[52] U.S. Cl. ........................................ 106/89; 106/97; 106/315
[58] Field of Search ............................ 106/89, 97, 315

[56] References Cited

U.S. PATENT DOCUMENTS

| | | | |
|---|---|---|---|
| 2,868,295 | 1/1959 | Brooks et al. | 106/89 |
| 3,140,956 | 7/1964 | Kamlet et al. | 106/315 |
| 3,874,885 | 4/1975 | Lyass et al. | 106/89 |
| 4,082,561 | 4/1978 | Nakagawa et al. | 106/89 |
| 4,209,335 | 6/1980 | Katayama et al. | 106/89 |

Primary Examiner—James Poer
Attorney, Agent, or Firm—Felfe & Lynch

[57] ABSTRACT

The present invention relates to liquid accelerators for the setting of concrete mixtures. These accelerators have a long shelf life even in higher concentrations than the liquid accelerators known heretofore and, within the defined concentrations, produce no precipitation. The new accelerators are characterized by containing only potassium aluminate, potassium carbonate and potassium hydroxide in a defined range. They can be used in any known hydraulic binding agents, they shorten the set time of these binding agents, and they improve the compressive strength of the products made with them.

7 Claims, No Drawings

LIQUID ACCELERATOR FOR THE SETTING OF CONCRETE MIXTURES

The present invention relates to a liquid accelerator for setting concrete mixtures, which is composed of alkali aluminates, alkali hydroxides and alkali carbonates. In addition, the invention relates to the use of this new accelerator in hydraulic binding agents based on Portland cements for accelerating the setting and curing of these binding agents and for sustaining the compressive strength of the products made using these binding agents.

It is known, for example, from German Offenlegungsschrift No. 2,445,512 to use aqueous solutions of sodium aluminate to accelerate the setting of concrete mixes. These sodium aluminate solutions, however, have the disadvantage that they are usable only within a certain concentration, because otherwise concentration precipitates settle out and the solutions thus can no longer be used in a spray nozzle. The obvious solution to this problem, of using dilute solutions is unacceptable because dilution involves the danger of a quality-degrading hydrolysis of the aluminate.

To eliminate the settling out of precipitates, it is therefore proposed in German Offenlegungsschrift No. 2,445,512 that sodium gluconate be added to the liquid accelerator because it has a stabilizing effect on the aluminate solution. The addition of gluconates or other compounds containing hydroxyl groups, however, has the disadvantage that this reduces the "set and cure" accelerating action, and the occurrence of precipitates, for example in the case of concentrated solutions, cannot be prevented under extreme temperature conditions.

It is furthermore known to add potassium carbonate to accelerators based on sodium aluminate solutions for the improvement of their qualities. This, however, results in solutions of only moderate shelf life because, especially in the case of concentrated solutions, alkali carbonates precipitate out of such solutions in the course of time, resulting, again, in the difficulties mentioned above.

The rapid setting of concrete mixtures, however, has the disadvantage that concrete set in this manner loses early strength while it is curing. This reduction of compressive strength in the course of 28 days is greater the more rapidly the concrete mixture sets.

The problem therefore existed of finding a setting accelerator for concrete mixes, which will be in liquid form, and which will contain the alkali aluminate in highly concentrated form. These solutions are furthermore to have a long shelf life, producing no precipitation over several weeks of storage, and this extended shelf life is to be achieved without the addition of organic complexing agents. The accelerators are furthermore to affect the concrete mixes by making them set and cure quickly, with on the other hand, little or no loss of compressive strength of the solid castings during initial setting.

THE INVENTION

This object has been accomplished by the invention of a liquid accelerator for concrete mixtures, which is an aqueous solution of potassium compounds having a ratio of moles of potassium oxide which is not bound to potassium carbonate, to moles aluminum oxide of between 1.1 and 1.4; a content of water as solvent such that the molar ratio of water to aluminum oxide is between 9.5 and 20; and a potassium carbonate content of between 0.1 and 3.4 mole-percent. This accelerator can be used especially for accelerating the setting of concrete mixtures based on Portland cements, and it results in a reduction of the loss of compressive strength in the products made from these concrete mixtures.

The new accelerators cause in known concrete and mortar mixtures in amounts of 0.5% of weight and up, referred to the cement, an accelerating effect. The amount added, depends, among others, on the temperature of the mixture at the moment of its application. At lower temperatures bigger quantities must be added than at higher temperatures. In general, the new accelerators are added to these mixtures in quantities of between 2 and 6% of weight, referred to the cement.

The new accelerator contains, in contrast to the known accelerators, only the potassium compounds of the named salts. The total amount of potassium hydroxide must be within defined limits of a certain ratio to the amount of potassium aluminate. The total amount of KOH is composed of the amounts of potassium aluminate and potassium carbonate as well as of the free potassium hydroxide. It is best stated as $K_2O$, as potassium aluminate ideally corresponds to the formula $K_2O \cdot Al_2O_3$.

The solution contains, in accordance with the invention, a limited excess of potassium oxide. This excess is to be defined as the amount of potassium oxide that is not to be reckoned as stoichiometric either to the aluminate or to the carbonate.

This ratio can also be mathematically expressed as the difference between the total molar concentration of potassium oxide and the concentration of carbon dioxide (from the potassium carbonate) to the dissolved aluminum oxide (from the aluminate). It can be expressed as $[K_2O]-[CO_2]/[Al_2O_3]$. This ratio is also referred to as the caustic ratio. In accordance with the invention it is between 1.1 and 1.4, preferably between 1.25 and 1.37.

The water content of the solution specified by the invention is also related to the concentration of the dissolved aluminum oxide (from the potassium aluminate).

Mathematically expressed, it is the molar ratio of $[H_2O]/[Al_2O_3]$. This ratio, in accordance with the invention, is between 9.5 and 20, preferably between 14 and 17.

Within the claimed limits, the content of potassium carbonate can be varied widely; if possible, a level of 3.4 mole% of carbon dioxide is not to be exceeded, while the minimum is to be above 0.1 mole-% of carbon dioxide. The preferred limits are between 2 and 3 mole-%.

Solutions within the specified limits contain a larger amount of dissolved salts without the occurrence of concentration precipitates than comparable mixtures in which the same alkali concentration consists of sodium oxide or a mixture of sodium oxide and potassium oxide.

Production of the setting accelerators according to the invention suitably is made such that potassium carbonate is added to an alkaline potassium aluminate solution. At this preferably a potassium aluminate solution is used being obtained by treatment of alumina hydrate with KOH. This treatment can be made in the melt as well as with aqueous KOH. The ratio of the used potassium hydroxide solution to the alumina hydrate always shall be selected such, that the molar ratio of $K_2O$ to $Al_2O_3$ is between 1.1 to 1 and 1.4 to 1. In case the treatment is made with aqueous potassium hydroxide solution, preferrably such solutions are used the concentration of which is higher than 30 weight percent of KOH. Solutions with a concentration higher than 38 weight percent of KOH are of special advantage.

If the treatment of the alumina hydrate is made in the melt, this melt product and the potassium aluminate, resp., is treated with such a quantity of water that a saturated solution, if possible, is obtained.

For both examples of treatment potassium carbonate is added to the obtained solution. At this the potassium carbonate can be used as a solid sesquihydrate or concentrated aqueous solution. The water quantity totally added must be selected such that the molar ratio of $H_2O$ to $Al_2O_3$ is between 9.5 to 1 and 20 to 1.

The so obtained solution can include unwelcome reaction products acting for inst. as crystallization nucleus and/or causing unwanted precipitations during the subsequent time.

Therefore it is recommended to remove such unwanted reaction products from the solutions. This can be done in the known manner, as for inst. by filtration or decantation, at any time during or after the manufacturing process.

When using the setting accelerators according to the invention only a small decrease of the compressive strength is obtained during 28 days. In contrary to this, setting accelerators as hitherto known and being based on sodium aluminate/potassium carbonate/potassium hydroxide, have a decrease of the compressive strength after setting which can exceed 20% of the original values achieved for concrete without accelerator addition. Under comparable conditions, in general, the decrease in the mixtures according to the invention is only up to 15%.

The binding agents whose setting is improved by the accelerators of the invention include the hydraulic binding agents based on Portland cements. These binding agents are to be understood to include those which contain, in addition to the ground clinker contained in the cement, inorganic additives such as, for example, pozzolana, foundry sand, or even fly ash. Cementous binding agents which contain one or more of these additives exhibit the above-mentioned loss of compressive strength after 28 days to a heightened degree; the use of the accelerators of the invention is therefore especially indicated in the case of these binding agents, since this loss of strength is largely prevented.

Within the specified range of the caustic ratio and dilution, the liquid accelerators of the invention are stable and do not tend to form precipitates. At the limit levels, however, care must be taken to see that, at high caustic ratios, a correspondingly high dilution is chosen within the claimed range. The same applies to the lower limit of the caustic ratio. The possibilities of variation with regard to caustic ratio and dilution thus permit a wide-ranging adaptation to the need for acceleration of the setting of binding agents of various compositions. Examples of effective and stable formulations are:

| Example | Caustic Ratio $\frac{[K_2O] - [CO_2]}{[Al_2O_3]}$ | Dilution $\frac{[H_2O]}{[Al_2O_3]}$ | $[CO_2]$ |
|---|---|---|---|
| (a) | 1.39 | 18.75 | 3.4 |
| (b) | 1.22 | 11.91 | 0.31 |
| (c) | 1.10 | 9.57 | 0.05 |

In addition to the above-named additives, the mixtures, prepared and ready for use, also contain sand or other known inert substances whose grain size can vary widely. The mixtures to be set with the aid of the accelerator of the invention accordingly include all known concrete mixtures, mortars and slurries which contain hydraulic binding agents on the basis of ground clinker.

The following examples will demonstrate the accelerating action of the formulations of the invention on the setting of concrete and mortar.

EXAMPLE 1

A commercial cement (type Z-35 F) having a composition in accordance with DIN 1164 Part 1 was prepared as a test mixture having a water:cement ratio of 0.32 to 0.35 with 2%, by weight, of an accelerator of the invention having a caustic ratio of 1.29 and a dilution of 15.08. The carbon dioxide content was 2.16 mole-%.

The mixture obtained had, in accordance with DIN 1164, Part 5, a set starting time of 20 to 60 seconds and a set completion time of 60 to 210 seconds at a testing temperature of $293° \pm 2°$ K.

EXAMPLE 2

On the basis of DIN 1164, Part 7, mortar was prepared from 3 parts sand, 1 part Portland cement Z 35 F, and water in such an amount that the water:cement ratio was 0.59 to 0.61. An accelerator having a caustic ratio of 1.37, a dilution of 17.06 and a carbon dioxide content of 2.78 mole-% was added to the make-up water, in the amount of 3% of the weight of the cement.

At a test temperature of $293° \pm 2°$ K., the setting time of this mortar was measured at 30 to 45 seconds for the beginning and 60 to 90 sec for the end of the set according to standard.

EXAMPLE 3

The accelerators can also be added to a prepared wet mortar: a wet mortar corresponding to DIN 1164, Part 7, was prepared according to standard from 3 parts of standard sand and 1 part of Z 35 F Portland cement having a water to cement ratio of 0.5. 4% of an accelerator having a caustic ratio of 1.37, a dilution of 17.06 and a carbon dioxide content of 2.78 mole-% was then added rapidly in concentrated form to the wet mortar at $293° \pm 2°$ K. The setting times were 120 seconds for the start and 210 seconds for the end, according to standard.

It will be understood that the specification and examples are illustrative but not limitative of the present invention and that other embodiments within the spirit and scope of the invention will suggest themselves to those skilled in the art.

What is claimed is:

1. A liquid accelerator for setting concrete mixtures comprising an aqueous solution of potassium aluminate, potassium hydroxide and potassium carbonate wherein
   (a) the ratio of moles of $K_2O$ not bound to potassium carbonate to moles of $Al_2O_3$ is between about 1.1 and 1.4;
   (b) the content of water as a solvent is such that the ratio of moles of water to moles of $Al_2O_3$ is between about 9.5 and 20; and
   (c) the potassium carbonate content is between about 0.1 and 3.4 mole-%.

2. The accelerator of claim 1 wherein the ratio of moles of $K_2O$ not bound to potassium carbonate, to moles of $Al_2O_3$ is between 1.25 and 1.37.

3. The accelerator of claim 2 wherein the ratio of moles of water to moles $Al_2O_3$ is between 14 and 17.

4. The accelerator of claim 1 wherein the ratio of moles of water to moles $Al_2O_3$ is between 14 and 17.

5. In a mortar or concrete mixture based on Portland cement, the improvement comprising an effective amount of the liquid accelerator of claim 1 to accelerate the setting of the mixture.

6. The mixture of claim 5 containing between 2 and 6% of the accelerator based on the weight of the cement.

7. In a mortar or concrete mixture with a liquid accelerator according to claim 1, the improvement comprising limiting the loss of compressive strength at the age of 28 days to no more than 15% compared with the same mixture without said accelerator.

* * * * *